United States Patent [19]

Hayes

[11] 4,316,330

[45] Feb. 23, 1982

[54] MAGNIFYING DEVICE FOR USE WITH A TRIANGULAR RULE

[76] Inventor: Jess W. Hayes, 9208 Farmington Dr., Richmond, Va. 23229

[21] Appl. No.: 197,469

[22] Filed: Oct. 16, 1980

[51] Int. Cl.[3] .......................... B43L 7/00; G02B 27/02

[52] U.S. Cl. ........................................ 33/488; 350/116

[58] Field of Search .................. 33/488; 350/114–116, 350/241, 243, 245

[56] References Cited

U.S. PATENT DOCUMENTS

| | | | |
|---|---|---|---|
| 1,179,142 | 4/1916 | Shaughnessy | 350/243 X |
| 1,550,522 | 8/1925 | Ehrich . | |
| 1,773,899 | 8/1930 | Kaler . | |
| 1,806,422 | 5/1931 | Shaen . | |
| 2,011,945 | 8/1935 | Mathi . | |
| 2,355,161 | 8/1944 | Holstein . | |
| 2,502,039 | 3/1950 | Floyd | 33/488 |
| 2,941,313 | 6/1960 | Levin | 350/243 X |
| 4,190,322 | 2/1980 | Wortley | 350/115 X |

FOREIGN PATENT DOCUMENTS

| | | | |
|---|---|---|---|
| 17479 | 7/1934 | Australia | 350/243 |
| 2247152 | 9/1972 | Fed. Rep. of Germany | 350/241 |

*Primary Examiner*—Charles E. Phillips

*Attorney, Agent, or Firm*—Norman B. Rainer

[57] ABSTRACT

A device for attachment to a triangular rule having longitudinal grooves contains a magnifying glass mounted in a manner to have several modes of positional adjustability. The device includes resilient clamping means which permit facile positioning of the device along the length of the surfaces of the rule. Stablizing means associated with said clamping means prevents the device from toppling during use.

13 Claims, 5 Drawing Figures

MAGNIFYING DEVICE FOR USE WITH A TRIANGULAR RULE

BACKGROUND OF THE INVENTION

This invention relates to optical magnifying devices and more particularly to an optical magnifying device having several modes of positional adjustability and adapted for use as an attachment to a grooved triangular ruler or scale.

Triangular rulers or scales, as used by architects, engineers and draftsmen in preparing precision drawings or in making accurate measurements from existing drawings, contain several different linear scales, the subdivisional markings of which may be difficult to discern with the unaided eye. The use of magnifying glasses of various types have been earlier disclosed to render the markings of the ruler more legible. There has further been disclosed the use of magnifying glasses associated with mechanical structure permitting the magnifying glass device to slideably engage the longitudinal grooves generally present in each side of said triangular rulers. Such devices, as may be found for example in U.S. Pat. Nos. 1,806,422; 1,773,899 and 2,502,039, although improving the ease of reading the markings, lack the versatility of positional adjustment needed by those who use said rulers.

The need for adjustability of the magnifying glass is dictated by the fact that, to derive the sought benefit, the marking, the center of the magnifying glass, and the user's eye should be on substantially the same straight line or optical axis. This is not always readily accomplished under ordinary circumstances because the ruler may be used on an inclined or horizontal surface or may be positioned at different distances from the user's eyes, or may be oriented in different directions on the surface upon which the work is being done. Although the magnifying glass of U.S. Pat. No. 1,806,422 appears to have a lateral mode of positional adjustability, unless said magnifying glass is positioned directly above the ruler to which it is attached, it will cause the combined ruler-magnifying glass assembly to tip over, especially on an inclined surface. Obvious expedients which might be resorted to in order to secure the ruler to the work surface for improved postural stability would interfere with the necessary mobility of the ruler.

It is accordingly an object of the present invention to provide an optical magnifying device adapted for slideable attachment to a grooved triangular ruler.

It is another object of this invention to provide a device of the aforementioned nature having several modes of positional adjustment.

It is a further object to provide a device of the aforementioned nature having improved postural stability without interfering with the mobility of the ruler.

These objects and other objects and advantages of the invention will be apparent from the following description.

SUMMARY OF THE INVENTION

The above and other beneficial objects and advantages are accomplished in accordance with the present invention by a device adapted for attachment to a triangular scale rule resting on a substantially flat working surface, said rule having faces containing markings adjacent the longitudinal edges thereof and having continuous uniform longitudinal grooves centered in said faces. The device comprises (a) clamping means provided with a pair of opposed elongated parallel jaws resiliently urged toward each other and adapted to engage the grooves of the two upwardly directly faces of said rule, said jaws being interconnected by bridging means adapted to be positioned above the apex of said upwardly directed faces, (b) straight extension means supported by said clamping means at an upward angle in a perpendicular plane which bisects said jaws, (c) adjustable holding means adjacent the uppermost extremity of said extension means, (d) a magnifying glass pendantly supported by said holding means in a manner permitting rotative movement of the magnifying glass about an axis which is a diameter thereof and swinging movement in said perpendicular plane, and (e) stabilizing means fixedly attached to said device and adapted to prevent toppling movement of the assembly of said device and rule. The extension means, in coactive association with said holding means, permits variation of the distance of separation between the magnifying glass and said clamping means.

In a preferred embodiment of the device of this invention, said bridging means is provided with opposed compression levers disposed above said bridging means in coactive association therewith and adapted to counteract the resilient force which urges said jaws together.

BRIEF DESCRIPTION OF THE DRAWINGS

For a fuller understanding of the nature and objects of the invention, referral should be had to the following detailed description taken in connection with the accompanying drawing forming a part of this specification and in which similar numerals of reference indicate corresponding parts in all the figures of the drawings.

DESCRIPTION OF THE PREFERRED EMBODIMENTS

Figure 1:
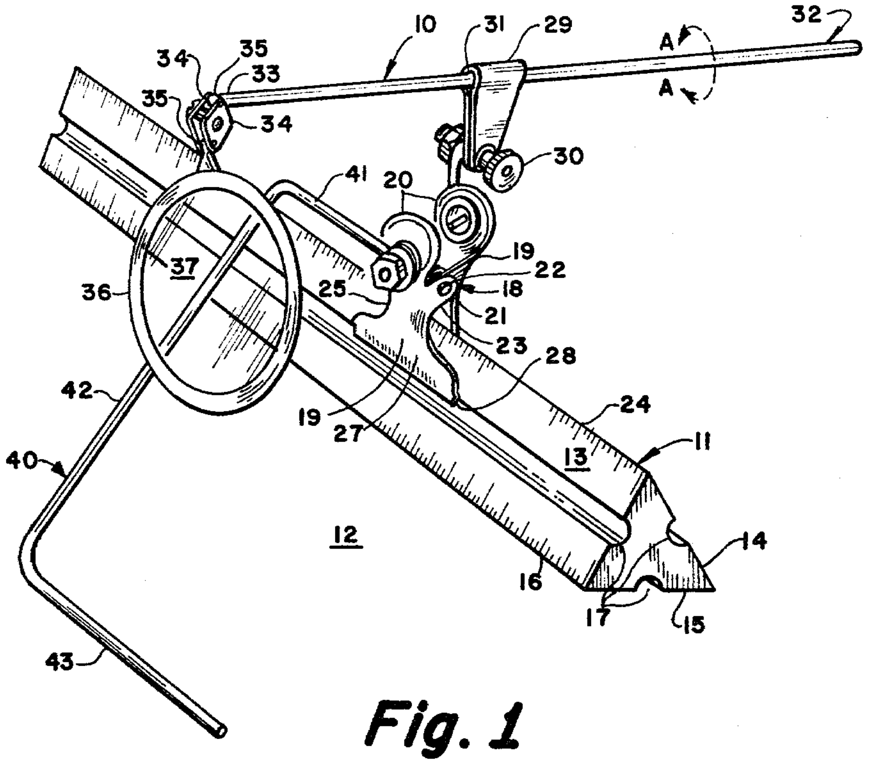
FIG. 1 is a perspective view of an embodiment of the device of this invention shown positioned on a triangular rule resting on a flat working surface.
Figure 2:
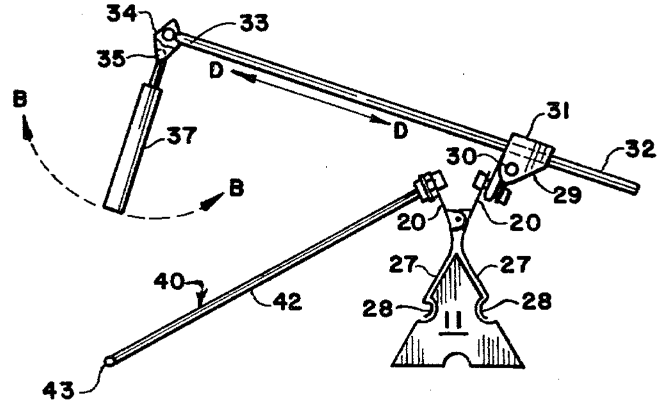
FIG. 2 is a side view of the device of FIG. 1.
Figure 3:
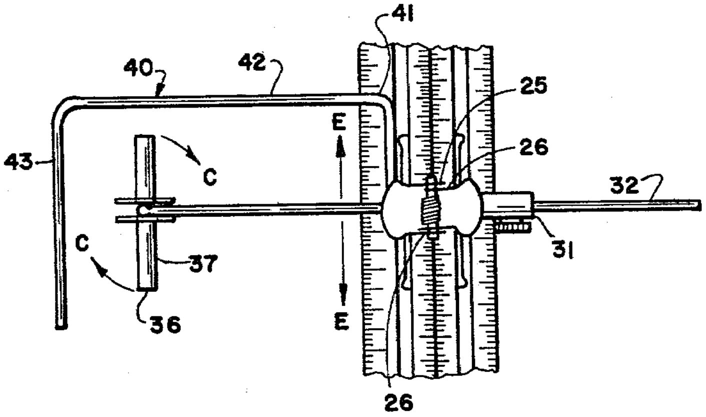
FIG. 3 is a top view of the device of FIG. 1.

Referring to FIGS. 1, 2 and 3, a device 10 of this invention is shown attached to a triangular rule 11 resting on a flat working surface 12. The rule is comprised of three faces, two of which designated 13 and 14, are upwardly directed and form apex edge 24, while the third face 15 rests in coplanar abutment with surface 12. Each of said three faces contains markings 16 adjacent the edges thereof and a continuous uniform longitudinal groove 17 centered therein. The cross-sectional configuration of the rule, taken in a plane perpendicular to any point along its longitudinal axis, is substantially an equilateral triangle.

The device 10 of this invention is provided with clamping means 18 comprised of a pair of idetical shaped members 19 in opposed mirror-image disposition joined in a manner to bridge apex edge 24 by a pin 21 which extends through apertures 22 in inwardly turned shoulders 23. A coil spring 25 is positioned on said pin in a manner such that the tangentially straight ends 26 of said spring abut against each shaped member 19 at a site above said pin, thereby serving to force apart the upper portions 20 of said shaped members. Each shaped member 19 is of integral construction and preferably fabricated of shaped sheet metal stock. The upper portions 20 are intended to serve as compression levers by whose use the separating force of the spring may be overcome. Adajcent the lower portions of shaped members 19 are opposed elongated parallel jaws 27, the extremities of which contain inwardly curved ridges 28 adapted to reside within the grooves of said rule. It is apparent that the action of spring 25 in forcing the compression levers apart attendantly forces jaws 27 together for gripping contact with grooves 17. In certain embodiments, the jaws may be provided with means for establishing rolling contact in the course of movement along the rule.

Attached adjacent the top of one of compression levers 20 is a harness member 29 having channel 31. Threadably adjustable means 30 capable of applying pressure to the facing sides of said harness member perform the functions of (a) controllably constricting said channel, (b) adjusting the angle of inclination of said channel, and (c) securing said harness member to said compression lever.

A straight rigid extension rod 32 is positioned within channel 31 and oriented in a manner such that its axis lies in a plane which perpendicularly bisects elongated jaws 27. Said rod 32 is further oriented such that it is upwardly directed in passing from said channel and across the compression lever alternative to the one which supports harness member 29.

The uppermost extremity 33 of rod 32 is provided with paired side plates 34 of a balljoint fitting. A ball member 35 enclosed between side plates 34 is attached to a frame 36 surrounding a circular magnifying glass 37. The ball member 35 is attached to said frame in a manner such that the center of said ball is coplanar with the medial plane of said lens, namely, a central plane which contains the circular perimeter of said lens. By virtue of its manner of attachment and interaction with the other components of the device of this invention, said lens has five modes of positional adjustability: (1) translational motion in the medial plane of the lens by rotation of rod 32 within channel 31 as indicated by arrows A-A in FIG. 1, (2) swinging motion within said ball joint fitting as indicated by arrows B-B in FIG. 2, wherein the diameter line of said lens originating at the point of the attachment of said ball to said frame is caused to move in a plane containing the axis of said rod, (d) rotational motion, as indicated by the arrows C-C in FIG. 3, wherein said lens is permitted by said ball joint fitting to pivot about the diameter line of said lens originating at the point of attachment of said ball to said frame, (4) spacing adjustability wherein the lens can be moved closer to the rule as indicated by the arrows D-D of FIG. 2, by insertional movement of rod 32 within channel 31, and (5) lateral displacement of said lens along said rule by the repositioning of clamping means 18 along grooves 17 as indicated by the arrows E-E of FIG. 3, and transfer of said clamping means to different surfaces of said rule.

Stablizing means in the form of an integral bent leg support 40 is utilized in the embodiment of FIGS. 1, 2 and 3. Said support is comprised of an upper portion 41 which attaches to upper portion 20 of one of the shaped members 19, a downwardly directed portion 42, and a horizontally directed portion 43 adapted to rest in coplanar relationship with the base of rule 11. The function of said stabilizing means, which may have still other equivalent configurations, is to prevent the weight of magnifying glass 37 and associated structure from toppling the device and rule attached thereto. It is to be noted that the configuration of the stabilizing means is such as to avoid interference with the field of view of the magnifying glass and to permit facile sliding movement upon the work surface.

Figure 4:
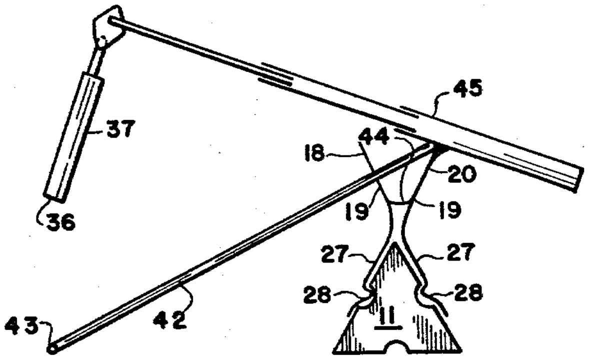
FIG. 4 is a side view of another embodiment of the device of this invention.

In the embodiment of the device of this invention shown in FIG. 4, the jaws of clamping means 18 are interconnected by bridging means in the form of curved flat spring 44 attached by soldering, welding or equivalent means to opposed shaped members 19. A straight rigid extension means is provided in the form of a set of telescoping tubes 45, the lowermost member of which is attached by soldering or equivalent means to an upper portion 20 of clamping means 18.

Figure 5:
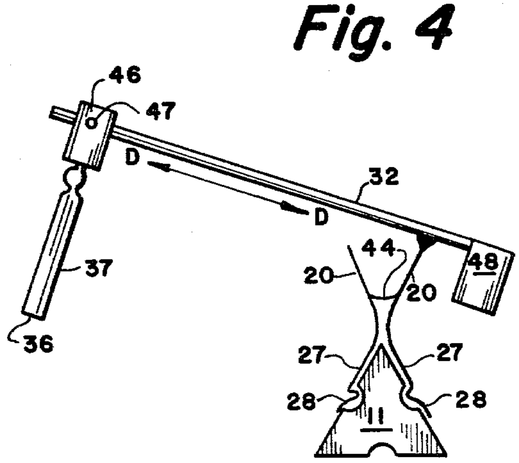
FIG. 5 is a side view of still another embodiment of the device of this invention.

In the embodiment of FIG. 5, an extension rod 32 is fixedly attached by soldering or equivalent means to an upper portion 20 of clamping means 18. Spacing adjustability of the lens with respect to the rule, as indicated by the arrows D-D, is achieved by a harness 46 adapted to slide along rod 32 and capable of being locked into any chosen position by set screw 47 which engages rod 32. The stabilizing means has the form of a counterweight 48 attached adjacent the lowermost extremity of rod 32.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A device adapted for attachment to a triangular scale rule resting on a substantially flat working surface, said rule having faces containing markings adjacent the longitudinal edges thereof and having continuous uniform longitudinal grooves centered therein, said device comprising:

(a) clamping means having two opposed elongated parallel jaws urged toward each other by resilient means and adapted to engage the grooves of the two upwardly directed faces of said rule, said jaws being moveably interengaged by bridging means adapted to be positioned above the apex of said upwardly directed faces, (b) straight elongated extension means supported by said clamping means in a manner such that the axis of elongation of said extension means is inclined to said working surface and lies in a plane perpendicular to and bisecting said jaws, (c) holding means attached to said extension means adjacent the uppermost extremity thereof, (d) a magnifying glass of circular configuration pendantly supported by said holding means in a manner permitting rotative movement of said magnifying glass about an axis which is a diameter thereof and swinging movement in said perpendicular plane, and (e) stablizing means fixedly attached to said device and adapted to prevent said device from toppling during use, whereby said extension means, in coactive interaction with said holding means, permits variation of the distance of separation between said magnifying glass and said clamping means.

2. The device of claim 1 wherein said clamping means is comprised of a pair of identical shaped members in opposed, substantially upright mirror-image disposition, the lower extremities of said shaped members carrying said jaws, and the upper extremities of said shaped members being adapted to permit manual counteraction of said resilient means.

3. The device of claim 2 wherein each of said shaped members possesses two shoulders in horizontally opposed spaced relationship, each shoulder possessing an aperture.

4. The device of claim 3 wherein said bridging means is comprised of an elongated pin which insertively engages the apertures of the shoulders of said shaped members.

5. The device of claim 4 wherein said resilient means is a coil spring positioned on said elongated pin and adapted to push apart said shaped members at an elevation above said pin.

6. The device of claim 1 wherein said bridging means and resilient means are comprised of a flat spring attached to said shaped members at horizontally opposed upper portions thereof and adapted to push apart said upper portions.

7. The device of claim 1 wherein said extension means is of a telescoping construction.

8. The device of claim 1 wherein said extension means is slideably engaged by one of said shaped members.

9. The device of claim 1 wherein said extension means is an integral rod affixed to one of said shaped members, and said holding means is positionable along the length of said rod.

10. The device of claim 1 wherein said holding means includes a balljoint fitting.

11. The device of claim 1 wherein said stabilizing means is an integral bent leg support attached to said clamping means and extending therefrom in the direction of said magnifying glass.

12. The device of claim 1 wherein said stabilizing means is comprised of a counterweight associated with the lower end of said extension means.

13. The device of claim 1 wherein said bridging means is coactively associated with opposed compression levers disposed above said bridging means and adapted to permit controlled counteraction of the effect of said resilient means, whereby said jaws may be moved apart.

* * * * *

UNITED STATES PATENT AND TRADEMARK OFFICE

CERTIFICATE OF CORRECTION

PATENT NO. : 4316330

DATED : Feb. 23, 1982

INVENTOR(S) : Jess W. Hayes

It is certified that error appears in the above—identified patent and that said Letters Patent is hereby corrected as shown below:

At column 2, line 60 , change " idetical " to read - identical - .

Signed and Sealed this

*Fourteenth* Day of *September 1982*

[SEAL]

*Attest:*

GERALD J. MOSSINGHOFF

*Attesting Officer* *Commissioner of Patents and Trademarks*